Patented Sept. 26, 1933

1,928,531

UNITED STATES PATENT OFFICE 1,928,531

PROCESS FOR ELIMINATING THE IMPURITIES CONTAINED IN VEGETABLE AND ANIMAL OILS AND FATS

Wilhelm Gensecke, Gonzenheim, near Frankfort-on-the-Main, Germany, assignor to American Lurgi Corporation, New York, N. Y., a corporation of New York No Drawing. Application October 20, 1930, Serial No. 490,106, and in Germany December 5, 1929

3 Claims. (Cl. 87—12)

This invention relates to a process for eliminating the impurities contained in vegetable and animal oils and fats.

It is known to eliminate the impurities, such as mucilaginous substances, lecithins, or the like, occurring in crude oils or fats, by means of dilute organic or inorganic acids. According to the character of the impurities present, one portion thereof is separated by coagulation and the other by solution. It is also known that mucilaginous substances, lecithins, and the like, can be separated from crude oils and fats by means of solutions of electrolyte salts ($CaCl_2, CuSO_4, MgCl_2$ and the like) by coagulation, gel formation or hydration. Alum and tannin have also been employed for separating these impurities from the oil.

In using these purifying agents, the crude oils and fats have to be heated to a comparatively high temperature, if the separated impurities are to settle down within a few hours. At high temperatures, however, these refining media have an unfavourable action on the oils and fats. For example the colouring matters of various oils and fats are unfavourably affected, a condition which often does not become apparent until during the subsequent bleaching, or splitting of the neutral oils may occur. The losses of oil through such treatment are comparatively extensive.

If low temperatures be employed in the known methods, the separated impurities take a long time to settle down, and the quality of the oil suffers through the prolonged contact with the refining medium. At a temperature of about 60° C. for example, the time required for the deposition of the impurities eliminated from Soya bean oil by a solution of an electrolyte salt is from 24 to 48 hours. Similar protracted treatment is also necessary in the case of all the reagents usually employed, and the output capacity of the refining apparatus is therefore small.

The present invention aims at obviating the foregoing drawbacks by employing mixtures of dilute mineral acids and solutions of electrolyte salts for eliminating impurities from oils and fats.

Such mixtures have a far more intensive action on the impurities than the acids and electrolyte-salt solutions taken singly, and the removal of the deposited or dissolved impurities proceeds more rapidly even at comparatively low temperature, besides being practically complete. The mixing of the purifying agent and oil being performed at low temperature, no injurious action is exerted on the oils or fats treated.

The separated impurities not only settle down very quickly but they also form a layer with a sharp plane of demarcation in relation to the refined oil, so that, with this process, the losses of oil are reduced to a minimum. After the oil has been mixed with the refining agent, three layers are formed; a bottom layer of clear refining agent, an intermediate sludge layer containing chiefly the separated impurities, and a top layer of the refined oil.

It is not necessary that the dilute mineral acid and electrolyte salt be added to the oil to be treated as a preformed mixture. The necessary amount of dilute mineral acid may be added first and the solution of electrolyte salt thereafter, or vice versa, so that the mixture of dilute mineral acid and electrolyte salt is formed in the presence of the oil. In this manner the provision of separate mixing apparatus may be avoided.

Example

Crude Soya bean oil is heated to about 50° C. in a refining vessel fitted with stirrers and 7% of a mixture of 4 parts of hydrochloric acid (6° Bé. strength) and 3 parts of a 30% solution of calcium chloride is then incorporated with the oil by stirring, for 10 minutes, after which the stirring mechanism is stopped. Flakes are formed, which quickly subside. If a sufficient quantity of the mixture—preferably ascertained by a laboratory test—be employed, the aforesaid three layers will be obtained.

The bottom and middle layers are drawn off, and the oil is washed with lukewarm water.

In order to eliminate the very small quantities of the refining agent, or moist particles of sludge remaining in suspension in the oil, the latter may be centrifuged, or treated with small quantities of adsorbent media, such as carbon, fullers' earth or the like, followed by centrifuging or filtration. The oil may also after treatment with an adsorbent medium be first dried in vacuo and then centrifuged or filtered.

I claim:—

1. A process for eliminating impurities, such as mucilaginous substances and lecithins, contained in vegetable and animal oils and fats, which comprises treating the crude oils and fats with dilute hydrochloric acid and a solution of an electrolyte salt at a temperature not exceeding about 60° C.

2. A process for eliminating impurities, such as mucilaginous substances and lecithins, contained in vegetable and animal oils and fats, which comprises treating the crude oils and fats with dilute hydrochloric acid and a solution of calcium chloride at a temperature not exceeding about 60° C.

3. A process as defined in claim 1 wherein the treating agents are added to the oil or fat successively.

WILHELM GENSECKE.